United States Patent
Rang et al.

(10) Patent No.: US 10,538,160 B2
(45) Date of Patent: Jan. 21, 2020

(54) COMBINED POWER TAKE-OFF AND SYNCHRONIZER ASSEMBLY

(71) Applicant: Parker-Hannifin Corporation, Cleveland, OH (US)

(72) Inventors: Brian L. Rang, Olive Branch, MS (US); Nabil Ibrahim Imam, Memphis, TN (US); John Loeffler, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/655,508

(22) PCT Filed: Feb. 13, 2014

(86) PCT No.: PCT/US2014/016193
§ 371 (c)(1),
(2) Date: Jun. 25, 2015

(87) PCT Pub. No.: WO2014/127097
PCT Pub. Date: Aug. 21, 2014

(65) Prior Publication Data
US 2015/0352951 A1    Dec. 10, 2015

Related U.S. Application Data

(60) Provisional application No. 61/764,233, filed on Feb. 13, 2013.

(51) Int. Cl.
*B60K 25/00* (2006.01)
*F16D 23/04* (2006.01)
(Continued)

(52) U.S. Cl.
CPC .............. *B60K 25/00* (2013.01); *B60K 17/28* (2013.01); *F16D 23/04* (2013.01); *F16D 2023/0681* (2013.01)

(58) Field of Classification Search
CPC ......... B60K 25/00; B60K 17/28; F16D 23/04; F16D 23/025; F16D 2023/0681
See application file for complete search history.

(56) References Cited

U.S. PATENT DOCUMENTS

| | | | |
|---|---|---|---|
| 2,349,491 A | 5/1944 | Dugas |
| 2,350,411 A | 6/1944 | Nabstedt |

(Continued)

FOREIGN PATENT DOCUMENTS

| | | |
|---|---|---|
| CN | 101344164 A | 1/2009 |
| EP | 1820991 A1 | 8/2007 |
| FR | 2929361 A1 | 10/2009 |

OTHER PUBLICATIONS

PCT International Search Report, Application No. PCT/US2014/016193, dated May 12, 2014.

(Continued)

*Primary Examiner* — Paul N Dickson
*Assistant Examiner* — Timothy Wilhelm
(74) *Attorney, Agent, or Firm* — MacMillan, Sobanski & Todd, LLC

(57) ABSTRACT

A combined power take-off and synchronizer assembly selectively connects a source of rotational energy to a driven accessory includes a power take-off portion that includes an input mechanism that is adapted to be rotatably driven by a source of rotational energy and an output mechanism that is rotatably driven by the input mechanism. The combined power take-off and synchronizer assembly also includes a synchronized clutch portion that selective connects the output mechanism of the power take-off portion to an output shaft that is adapted to be connected to a rotatably driven device.

16 Claims, 3 Drawing Sheets

(51) Int. Cl.
*B60K 17/28* (2006.01)
*F16D 23/06* (2006.01)

(56) References Cited

U.S. PATENT DOCUMENTS

| | | | | |
|---|---|---|---|---|
| 3,856,121 A * | 12/1974 | Usui | ........................ | F16D 23/06 |
| | | | | 192/53.34 |
| 5,311,787 A * | 5/1994 | Wilson | .................... | B60K 17/28 |
| | | | | 180/247 |
| 5,927,146 A * | 7/1999 | Dutson | ................... | F16D 23/06 |
| | | | | 192/53.34 |
| 6,260,682 B1 | 7/2001 | Rang et al. | | |
| 6,881,107 B2 * | 4/2005 | Roycroft | ............... | B60F 3/0007 |
| | | | | 440/12.5 |
| 8,047,323 B2 | 11/2011 | Downs et al. | | |
| 9,027,426 B2 * | 5/2015 | Roper | .................... | F16D 23/025 |
| | | | | 192/53.33 |
| 9,194,443 B2 * | 11/2015 | Stix | ......................... | F16D 23/02 |
| 2007/0209457 A1 | 9/2007 | Irikura et al. | | |
| 2009/0314108 A1 * | 12/2009 | Graves | ................... | B60K 17/28 |
| | | | | 74/15.6 |
| 2010/0099533 A1 | 4/2010 | Horsfall et al. | | |
| 2012/0006643 A1 * | 1/2012 | Sporleder | ............... | F16D 23/06 |
| | | | | 192/53.341 |
| 2015/0167750 A1 * | 6/2015 | Grogg | .................... | F16D 23/06 |
| | | | | 192/53.1 |

OTHER PUBLICATIONS

European Search Report, Application No. EP 14751220.6, dated Dec. 14, 2016.
European Search Report, Application No. 18186044.6, dated Sep. 11, 2018.

* cited by examiner

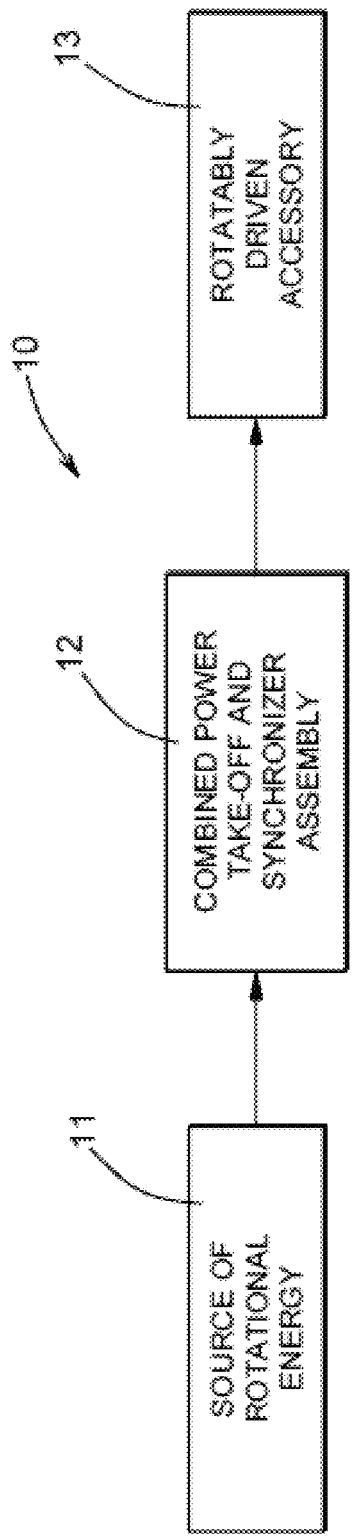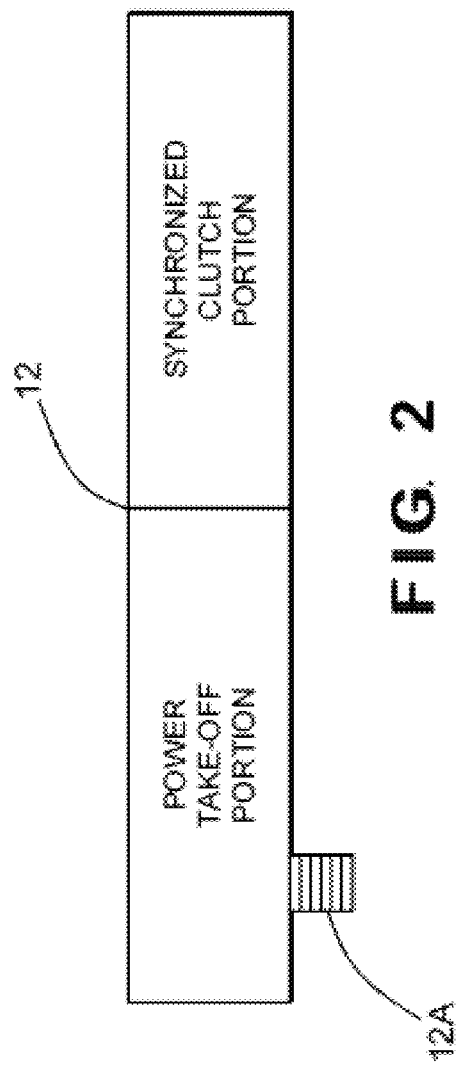

COMBINED POWER TAKE-OFF AND SYNCHRONIZER ASSEMBLY

CROSS-REFERENCE TO RELATED APPLICATIONS

This application is the National Phase of International Application PCT/US2014/016193 filed Feb. 13, 2014, which designated the U.S. That International Application was published in English under PCT Article 21(2) on Aug. 21, 2014 as International Publication Number WO 2014/127097A1. PCT/US2014/016193 claims the benefit of U.S. Provisional Application No. 61/764,233, filed Feb. 13, 2013. Thus, the subject nonprovisional application also claims priority to U.S. Provisional Application No. 61/764,233, filed Feb. 13, 2013. The disclosures of both applications are incorporated herein by reference.

BACKGROUND OF THE INVENTION

This invention relates in general to power take-offs for providing rotational energy from a source of rotational energy to a driven accessory. In particular, this invention relates to a combined power take-off and synchronized clutch assembly (referred to herein more simply as a synchronizer assembly for selectively connecting the source of rotational energy to the driven accessory.

A power take-off is a well known mechanical device that is often used in conjunction with a source of rotational energy, such as a vehicle engine or transmission, to provide rotational energy to a driven accessory, such as a hydraulic pump that is supported on the vehicle. For example, power take-offs are commonly used on industrial and agricultural vehicles to provide rotational energy to hydraulic pumps that, in turn, are used to operate hydraulically driven accessories such as plows, trash compactors, lifting mechanisms, winches, and the like. The power take-off provides a simple, inexpensive, and convenient means for supplying energy from the source of rotational energy to the hydraulic pump that, in turn, provides relatively high pressure fluid to operate the driven accessory.

A typical power take-off includes an input mechanism and an output mechanism. The input mechanism of the power take-off is adapted to be connected to the source of rotational energy so as to be rotatably driven whenever the source of rotational energy is operated. The output mechanism of the power take-off is adapted to be connected to the rotatably driven accessory. In some instances, the input mechanism of the power take-off is directly connected to the output mechanism such that the driven accessory is rotatably driven whenever the source of rotational energy is operated. In other instances, a clutch assembly is provided between the input mechanism and the output mechanism such that the driven accessory is rotatably driven only when the clutch assembly is engaged while the source of rotational energy is operated.

The structures of the clutch assemblies that are typically provided in conventional power take-offs can be classified in two general categories. The first category is often referred to as a manual shift clutch assembly, which uses a sliding gear or similar splined coupling to selectively connect the input mechanism of the power take-off to the output mechanism. Manual shift clutch assemblies are relatively simple and inexpensive, but are prone to damage if operated improperly. The second category is often referred to as a hot shift clutch assembly, which uses plurality of friction discs to selectively connect the input mechanism of the power take-off to the output mechanism. Hot shift clutch assemblies are less prone to damage, but are relatively complicated and expensive. Thus, it would be desirable to provide an improved structure for a power take-off that is relatively simple, inexpensive, and not prone to damage.

SUMMARY OF THE INVENTION

This invention relates to a combined power take-off and synchronizer assembly for selectively connecting a source of rotational energy to a driven accessory that is relatively simple, inexpensive, and not prone to damage. The combined power take-off and synchronizer assembly includes a power take-off portion that includes an input mechanism that is adapted to be rotatably driven by a source of rotational energy and an output mechanism that is rotatably driven by the input mechanism. The combined power take-off and synchronizer assembly also includes a synchronized clutch portion that selectively connects the output mechanism of the power take-off portion to an output shaft that is adapted to be connected to a rotatably driven device.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a block diagram of a power train system that includes a combined power take-off and synchronizer assembly in accordance with this invention.

FIG. 2 is a block diagram of the combined power take-off and synchronizer assembly illustrated in FIG. 1.

DETAILED DESCRIPTION OF THE PREFERRED EMBODIMENT

Figure 3:
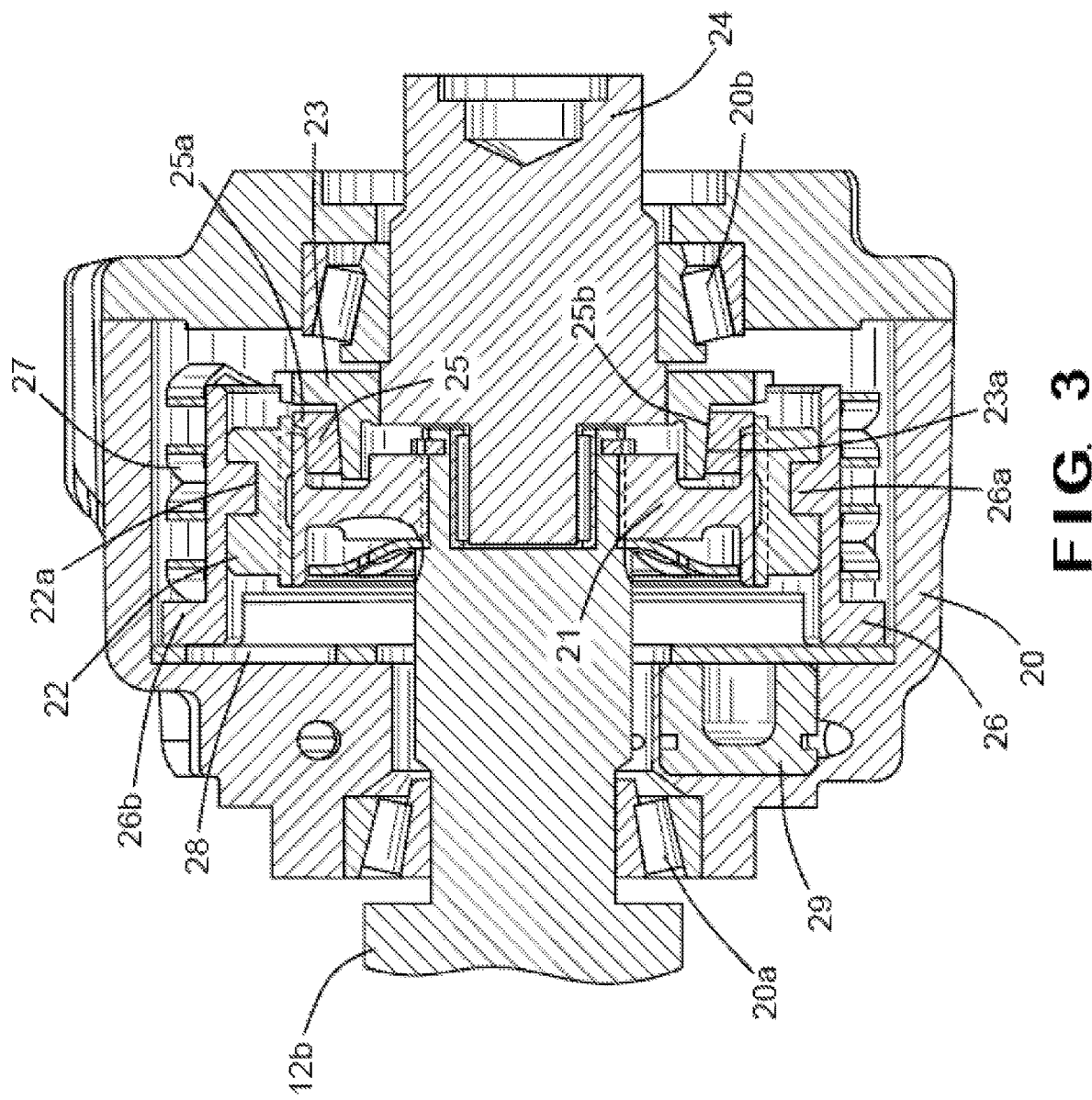
FIG. 3 is a sectional elevational view of portions of the combined power take-off and synchronizer assembly illustrated in FIG. 1, wherein the synchronizer is shown in a disengaged condition.

Referring now to the drawings, there is illustrated in FIG. 1 a power train system, indicated generally at 10, in accordance with this invention. The power train system 10 includes a source of rotational energy 11 that is conventional in the art. For example, the source of rotational energy 11 may be a vehicle engine or transmission. However, the source of rotational energy 11 may be embodied as any structure that is capable of generating or otherwise providing rotational energy. The source of rotational energy 11 is connected to rotatably drive a combined power take-off and synchronizer assembly 12 in accordance with this invention. The structure and operation of the combined power take-off and synchronizer assembly 12 will be explained in detail below. The combined power take-off and synchronizer assembly 12 is, in turn, connected to selectively rotatably drive a driven accessory 13 that is also conventional in the art. For example, the rotatably driven accessory 13 may be a hydraulic pump that is supported on the vehicle. However, the rotatably driven accessory 13 may be embodied as any structure that is capable of utilizing rotational energy.

Figure 4:
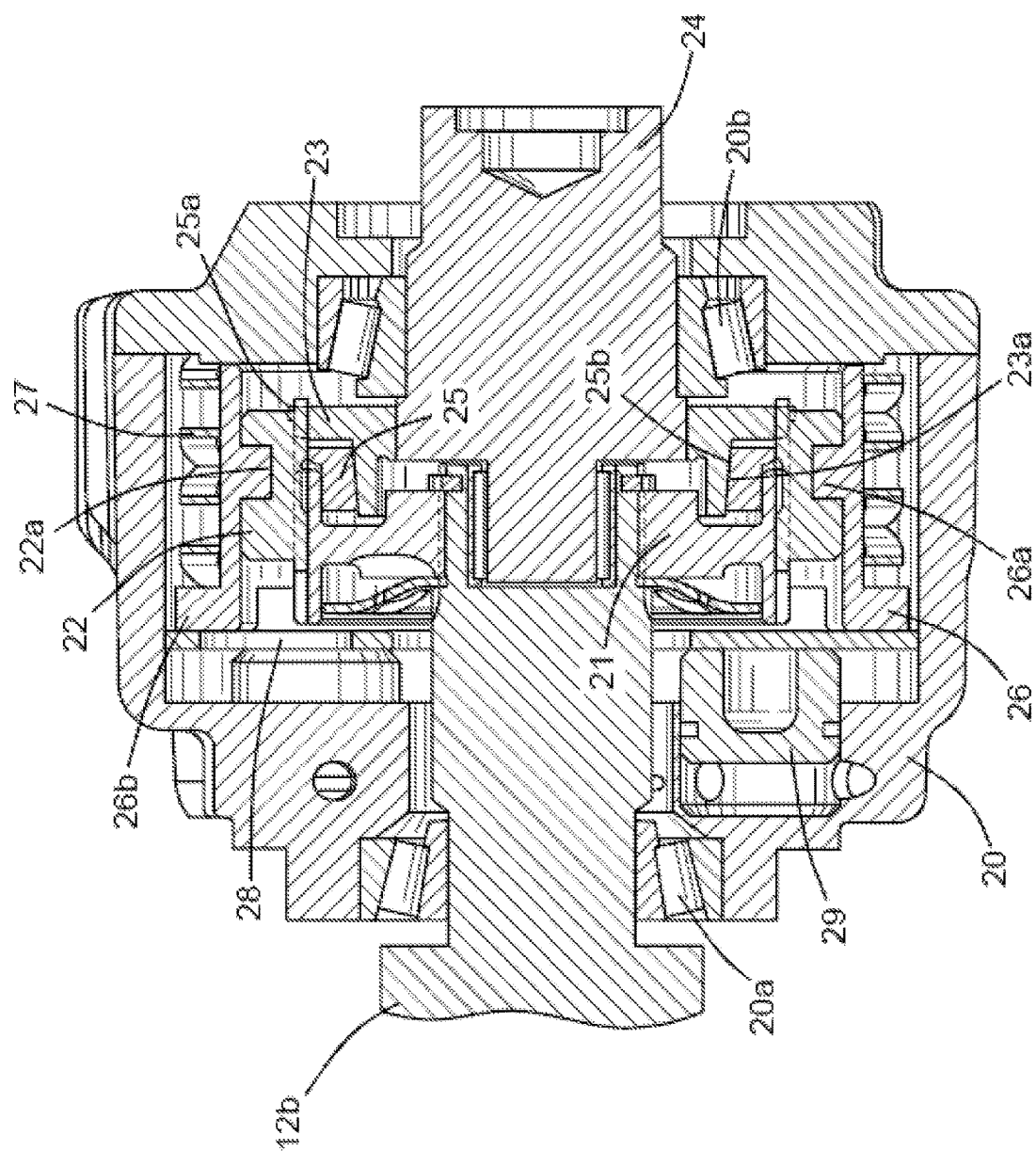
FIG. 4 is a sectional elevational view similar to FIG. 3, wherein the synchronizer is shown in an engaged condition.

FIGS. 2, 3, and 4 illustrates in more detail the structure of the combined power take-off and synchronizer assembly 12 illustrated in FIG. 1. As shown in FIG. 2, the combined power take-off and synchronizer assembly 12 includes a power take-off portion and a synchronized clutch portion. The power take-off portion is, of itself, conventional in the art and may be embodied as any structure that includes an input mechanism and an output mechanism that is rotatably driven by the input mechanism. For example, as is well known in the art, the power take-off portion may include a hollow housing having a mounting surface provided thereon. An opening can be provided through the mounting surface of the power take-off housing. An input gear 12a may be rotatably supported within the power take-off housing and include a portion that extends outwardly through the opening provided through the mounting surface. The mounting surface of the power take-off housing is adapted to be secured (typically by a plurality of bolts) to a corresponding mounting surface provided on the source of rotational energy 11. As is well known in the art, the portion of the input gear 12a that extends through the opening of the power take-off housing is adapted to extend within a portion of the source of rotational energy 11 and engage a corresponding gear or other mechanism provided therein. Thus, the input gear 12a of the power take-off portion is rotatably driven whenever the gear contained within the source of rotational energy 11 is rotatably driven.

The input gear 12a of the power take-off portion of the combined power take-off and synchronizer assembly 12 may be splined onto or otherwise supported on an input gear hub for concurrent rotation. The input gear hub can, in turn, be rotatably supported on an input shaft by a pair of roller bearings. First and second ends of the input shaft may be respectively supported in first and second bores provided in the power take-off housing. The input shaft is, in turn, connected to an output shaft 12b (see FIGS. 3 and 4) so as to be rotatably driven whenever the input gear 12a and the input shaft of the power take-off portion are rotatably driven.

FIGS. 3 and 4 illustrate a representative structure for the synchronized clutch portion of the combined power take-off and synchronizer assembly 12 illustrated in FIG. 1. As shown therein, the synchronized clutch portion includes a housing 20 having a first bearing 20a that rotatably supports the output shaft 12b of the power take-off portion. An inner portion of an annular hub 21 is splined or otherwise secured to an inner end of the output shaft 12b of the power take-off portion for rotation therewith. In the illustrated embodiment, the hub 21 is axially fixed in position on the output shaft 12b of the power take-off portion, although such is not required. An annular collar 22 is splined or otherwise secured to an outer portion of the hub 21 for rotational movement therewith and for axial movement relative thereto. The collar 22 is provided with an outer annular groove 22a or other similar structure for a purpose that will be explained below.

The collar 22 is axially slidable between a disengaged position illustrated in FIG. 3 and an engaged position illustrated in FIG. 4. When the collar 22 is in the disengaged position, the collar 22 engages only the outer portion of the hub 21 for rotational movement therewith. When the collar 22 is in the engaged position, however, the collar 22 engages both the outer portion of the hub 21 and an outer portion of an annular cone 23. As a result, the cone 23 is connected to the hub 21 for rotational movement therewith. The cone 23 is, in turn, splined or otherwise secured to an outer portion of an output shaft 24 for rotation therewith. The illustrated output shaft 24 is rotatably supported on the housing 20 of the synchronized clutch portion by a second bearing 20b, although such is not required. Also, a portion of the illustrated output shaft 24 of the synchronized clutch portion is rotatably journaled in an inner portion of the output shaft 12b of the power take-off portion, although again such is not required.

Thus, when the collar 22 is in the engaged position illustrated in FIG. 4, the output shaft 12b of the power take-off portion is connected through the hub 21, the collar 22, and the cone 23 to rotatably drive the output shaft 24. Conversely, when the collar 22 is in the disengaged position illustrated in FIG. 3, the output shaft 12b of the power take-off portion rotatably drives the hub 21 and the collar 22, but does not rotatably drive the cone 23 or the output shaft 24. The cone 23 is provided with a tapered outer surface 23a for a reason that will be explained below.

As shown in FIGS. 3 and 4, an annular baulk ring 25 is disposed between the hub 21 and the cone 23. The baulk ring 25 includes an outwardly protruding portion 25a and an tapered inner surface 25b. The outwardly protruding portion 25a of the baulk ring 25 is adapted to be engaged by the annular collar 22 as the annular collar 22 is moved from the disengaged position illustrated in FIG. 3 to the engaged position illustrated in FIG. 4. The tapered inner surface 25b of the baulk ring 25 is disposed adjacent to the tapered outer surface 23a of the cone 23. Thus, when the annular collar 22 is moved from the disengaged position toward the engaged position, the annular collar 22 initially engages the outwardly protruding portion 25a of the baulk ring 25. Such engagement causes the baulk ring 25 to move axially toward the cone 23. As a result, the tapered inner surface 25b of the baulk ring 25 is moved into frictional engagement with the tapered outer surface 23a of the cone 23. The purpose for this frictional engagement will be explained below. Thereafter, further axial movement of the collar 22 will cause it to engage the outer portion of the cone 23, again for a purpose that will be explained below.

A shifting mechanism is provided for selectively moving the collar 22 between the disengaged position illustrated in FIG. 3 and the engaged position illustrated in FIG. 4. In the illustrated embodiment, this shifting mechanism includes an annular shift fork 26 that is disposed about the outer surface of the collar 22 for rotational movement relative thereto. The shift fork 26 includes one or more inwardly extending protrusions 26a that extends within some or all of the outer annular groove 22a provided on the collar 22. Thus, the shift fork 26 is connected to the collar 22 for axial movement therewith. The shift fork 26 also includes an axially facing flange 26b or other similar structure. A spring 27 reacts between the flange 26b provided on the shift fork 26 and an interior surface provided on the housing 20 of the synchronized clutch portion. The spring 27 urges the shift fork 26 (and, therefore, the collar 22) to move axially toward the disengaged position illustrated in FIG. 3. However, the spring 27 also allows the shift fork 26 (and, therefore, the collar 22) to move axially toward the engaged position illustrated in FIG. 4 when an appropriate force is exerted on the shift fork 26 against the urging of the spring 27.

The synchronized clutch portion also includes a structure for selectively applying such an appropriate force against the urging of the spring 27 so as to move the shift fork 26 axially from the disengaged position illustrated in FIG. 3 toward the engaged position illustrated in FIG. 4. In the illustrated embodiment, this force-applying structure includes a shift plate 28 that is disposed between the shift fork 26 and a plurality of pistons 29 supported in respective cylinders formed or otherwise provided in the housing 20 of the synchronized clutch portion. Preferably, four of such pistons 29 (only two are illustrated) are provided concentrically about the output shaft 12b of the power take-off portion.

However, a greater or lesser number of such pistons 29 (including only one, if desired) may be provided, and such piston(s) 29 may be arranged in any desired configuration.

The pistons 29 can be actuated by the application of fluid pressure, either pneumatically or hydraulically. Alternatively, the pistons 29 can be actuated in any other desired manner including, for example, electrically (such as by a motor or solenoid) or mechanically (such as by a manually operable linkage). Regardless, when so actuated, the pistons 29 exert respective forces against the shift plate 28, and a collective amount of such forces is applied to the flange 26b of the shift fork 26 against the urging of the spring 27. When the collective amount of the forces exerted by the pistons 29 exceeds the amount of force exerted by the spring 27, the shift fork 26 will be moved axially from the disengaged position illustrated in FIG. 3 toward the engaged position illustrated in FIG. 4.

In operation, the combined power take-off and synchronizer assembly 12 can be used to selectively connect the source of rotational energy 11 to rotatably drive the driven accessory 13. To accomplish this, the pistons 29 are initially actuated to exert a collective force against the shift plate 28 which, in turn, exerts that collective force against the flange 26b of the shift fork 26. When the amount of such collective force exceeds the amount of force exerted by the spring 27 against the flange 26b of the shift fork 26 in the opposite direction, the shift fork 26 will be moved axially from the disengaged position illustrated in FIG. 3 toward the engaged position illustrated in FIG. 4.

Such axial movement of the shift fork 26 causes corresponding axial movement of the annular collar 22 toward the engaged position. As described above, the collar 22 initially engages the outwardly protruding portion 25a of the baulk ring 25. Consequently, the baulk ring 25 is also moved axially toward the engaged position. As also described above, the tapered inner surface 25b of the baulk ring 25 is disposed adjacent to the tapered outer surface 23a of the cone 23. Thus, when the baulk ring 25 is axially moved by the collar 22 toward the engaged position, the tapered inner surface 25b of the baulk ring 25 frictionally engages the tapered outer surface 23a of the cone 23. As a result, the cone 23 is caused to rotate by the baulk ring 25. In this manner, the rotational speed of the cone 23 can be synchronized with the rotational speed of the baulk ring 25 and the collar 22 before the collar 22 is moved into positive engagement with the cone 23.

After the rotational speeds of the cone 23 and the baulk ring 25 have been synchronized, further axial movement of the collar 22 causes the collar 22 to subsequently engage the outer portion of the cone 23 as described above. Thus, the collar 22 is positively engaged with the cone 23 for rotation therewith. As discussed above, the collar 22 is splined or otherwise secured to the hub 21 for rotational movement therewith, and the hub 21 is splined or otherwise secured to the output shaft 12b of the power take-off portion for rotation therewith. Consequently, the combined power take-off and synchronizer assembly 12 connects the source of rotational energy 11 to rotatably drive the driven accessory 13. To subsequently disconnect the source of rotational energy 11 from rotatably driving the driven accessory 13, the pistons 29 are de-actuated. This removes the collective force exerted by the pistons 29 and allows the force exerted by the spring 27 against the flange 26b of the shift fork 26 to move the shift fork 26 axially back from the engaged position illustrated in FIG. 4 toward the disengaged position illustrated in FIG. 3.

Thus, it can be seen that the combined power take-off and synchronizer assembly 12 of this invention is relatively simple, inexpensive, and less prone to damage than the prior art devices described above. The concentric arrangement of the pistons 29 and other components of the shifting mechanism provides for a reduced overall size for the combined power take-off and synchronizer assembly 12, which is an important consideration in vehicular power train systems of this general type.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A combined power take-off and synchronized clutch assembly that is adapted to be secured to a mounting surface provided on a source of rotational energy, the combined power take-off and synchronizer assembly comprising:

(1) a power take-off portion including:
 (A) a housing having a mounting surface that is adapted to be secured to a mounting surface provided on a source of rotational energy, the mounting surface of the housing of the power take-off portion having an opening therethrough,
 (B) an input mechanism including an input gear that is rotatably supported on the housing of the power take-off portion and that has a portion that extends outwardly through the opening provided through the mounting surface of the housing of the power take-off portion and is adapted to extend within and be rotatably driven by the source of rotational energy, and
 (C) an output mechanism that is rotatably driven by the input mechanism; and
(2) a synchronized clutch portion that selectively connects the output mechanism of the power take-off portion to an output shaft of the synchronized clutch portion that is adapted to be connected to a rotatably driven hydraulic pump that, in turn, operates a hydraulically driven accessory, wherein
the output mechanism of the power take-off portion is rotatably journaled on the output shaft of the synchronized clutch portion,
the synchronized clutch portion includes a force-applying structure that is provided concentrically about the output mechanism of the power take-off portion for selectively connecting the output mechanism of the power take-off portion to the output shaft of the synchronized clutch portion, and
the force-applying structure includes a shift plate and a plurality of pistons, both of which are provided concentrically about the output mechanism of the power take-off portion.

2. The combined power take-off and synchronized clutch assembly defined in claim 1 wherein the synchronized clutch portion includes a hub that is connected for rotation with the output mechanism of the power take-off portion, a cone that is connected for rotation with the output shaft, and a collar that is connected for rotation with the hub and is selectively movable into engagement with the cone for rotation therewith.

3. The combined power take-off and synchronized clutch assembly defined in claim 2 further including a baulk ring that is disposed between the hub and the cone for frictional engagement therebetween before the collar is moved into engagement with the cone for rotation therewith.

4. The combined power take-off and synchronized clutch assembly defined in claim 3 wherein the baulk ring includes a tapered surface that is disposed adjacent to a tapered surface of the cone such that the tapered surfaces of the baulk ring and the cone frictionally engage one another before the collar is moved into engagement with the cone for rotation therewith.

5. The combined power take-off and synchronized clutch assembly defined in claim 2 further including a shifting mechanism for selectively moving the collar into engagement with the cone for rotation therewith.

6. The combined power take-off and synchronized clutch assembly defined in claim 1 wherein the output shaft of the synchronized clutch portion is rotatably journaled on the output mechanism of the power take-off portion.

7. The combined power take-off and synchronized clutch assembly defined in claim 1 wherein the output mechanism is rotatably supported within the housing, and wherein the synchronized clutch portion is disposed within the housing.

8. A power train system comprising:
a source of rotational energy including a mounting surface having an opening therethrough;
a combined power take-off and synchronized clutch assembly that is rotatably driven by the source of rotational energy;
a hydraulic pump that is connected to and selectively rotatably driven by the combined power take-off and synchronizer assembly; and
a hydraulically driven accessory that is connected to and rotatably driven by the hydraulic pump;
wherein the combined power take-off and synchronized clutch assembly includes:
(1) a power take-off portion including:
   (A) a housing having a mounting surface that is secured to the mounting surface provided on the source of rotational energy, the mounting surface of the housing of the power take-off portion having an opening therethrough,
   (B) an input mechanism including an input gear that is rotatably supported on the housing of the power take-off portion and that has a portion that extends outwardly through the opening provided through the mounting surface of the housing of the power take-off portion and that extends within and is rotatably driven by the source of rotational energy, and
   (C) an output mechanism that is rotatably driven by the input mechanism; and
(2) a synchronized clutch portion that selectively connects the output mechanism of the power take-off portion to an output shaft of the synchronized clutch portion that is connected to the hydraulic pump, wherein
the output mechanism of the power take-off portion is rotatably journaled on the output shaft of the synchronized clutch portion,
the synchronized clutch portion includes a force-applying structure that is provided concentrically about the output mechanism of the power take-off portion for selectively connecting the output mechanism of the power take-off portion to the output shaft of the synchronized clutch portion, and
the force-applying structure includes a shift plate and a plurality of pistons, both of which are provided concentrically about the output mechanism of the power take-off portion.

9. The power train system defined in claim 8 wherein the synchronized clutch portion includes a hub that is connected for rotation with the output mechanism of the power take-off portion, a cone that is connected for rotation with the output shaft, and a collar that is connected for rotation with the hub and is selectively movable into engagement with the cone for rotation therewith.

10. The power train system defined in claim 9 further including a baulk ring that is disposed between the hub and the cone for frictional engagement therebetween before the collar is moved into engagement with the cone for rotation therewith.

11. The power train system defined in claim 10 wherein the baulk ring includes a tapered surface that is disposed adjacent to a tapered surface of the cone such that the tapered surfaces of the baulk ring and the cone frictionally engage one another before the collar is moved into engagement with the cone for rotation therewith.

12. The power train system defined in claim 9 further including a shifting mechanism for selectively moving the collar into engagement with the cone for rotation therewith.

13. The power train system defined in claim 8 wherein the output shaft of the synchronized clutch portion is rotatably journaled on the output mechanism of the power take-off portion.

14. The combined power train system defined in claim 8 wherein the output mechanism is rotatably supported within the housing, and wherein the synchronized clutch portion is disposed within the housing.

15. A combined assembly of a vehicle, a power train system, and a hydraulically driven accessory comprising:
a vehicle;
a source of rotational energy supported on the vehicle and including a mounting surface having an opening therethrough;
a combined power take-off and synchronized clutch assembly that is rotatably driven by the source of rotational energy;
a hydraulic pump that is connected to and selectively rotatably driven by the combined power take-off and synchronizer assembly; and
a hydraulically driven accessory supported on the vehicle that is connected to and rotatably driven by the hydraulic pump, wherein the hydraulically driven accessory is one of a plow, a trash compactor, a lifting mechanism, and a winch;
wherein the combined power take-off and synchronized clutch assembly includes:
(1) a power take-off portion including:
   (A) a housing having a mounting surface that is secured to the mounting surface provided on the source of rotational energy, the mounting surface of the housing of the power take-off portion having an opening therethrough,
   (B) an input mechanism including an input gear that is rotatably supported on the housing of the power take-off portion and that has a portion that extends outwardly through the opening provided through the mounting surface of the housing of the power take-off portion and that extends within and is rotatably driven by the source of rotational energy, and
   (C) an output mechanism that is rotatably driven by the input mechanism; and
(2) a synchronized clutch portion that selectively connects the output mechanism of the power take-off portion to an output shaft of the synchronized clutch portion that is connected to the hydraulic pump, wherein
the output mechanism of the power take-off portion is rotatably journaled on the output shaft of the synchronized clutch portion, the synchronized clutch portion includes a force-applying structure that is provided concentrically about the output mechanism of the power take-off portion for selectively connecting the output mechanism of the power take-off portion to the output shaft of the synchronized clutch portion, and the force-applying structure includes a shift plate and a plurality of pistons, both of which are provided concentrically about the output mechanism of the power take-off portion.

16. The combined assembly of a vehicle, a power train system, and a hydraulically driven accessory defined in claim 15 wherein the output mechanism is rotatably supported within the housing, and wherein the synchronized clutch portion is disposed within the housing.

* * * * *